(12) United States Patent
Foley et al.

(10) Patent No.: US 9,877,503 B2
(45) Date of Patent: Jan. 30, 2018

(54) HAND OPERABLE JUICER

(71) Applicant: Radius Corporation, Kutztown, PA (US)

(72) Inventors: Kevin Foley, Kempton, PA (US); James Eldon, Barto, PA (US)

(73) Assignee: Radius Corporation, Kutztown, PA (US)

( * ) Notice: Subject to any disclaimer, the term of this patent is extended or adjusted under 35 U.S.C. 154(b) by 164 days.

(21) Appl. No.: 14/754,702

(22) Filed: Jun. 30, 2015

(65) Prior Publication Data

US 2015/0296861 A1    Oct. 22, 2015

Related U.S. Application Data

(62) Division of application No. 13/861,514, filed on Apr. 12, 2013, now Pat. No. 9,095,169.

(51) Int. Cl.
| | |
|---|---|
| *A47J 43/14* | (2006.01) |
| *A23J 1/00* | (2006.01) |
| *A23N 1/02* | (2006.01) |
| *A23N 1/00* | (2006.01) |
| *A23L 2/06* | (2006.01) |
| *A47J 19/02* | (2006.01) |

(52) U.S. Cl.
CPC .............. *A23N 1/02* (2013.01); *A23L 2/06* (2013.01); *A23N 1/003* (2013.01); *A47J 19/022* (2013.01)

(58) Field of Classification Search
CPC .......... A47J 43/14; A47J 43/145; A47J 19/02; A47J 19/022; A47J 42/56; A47J 19/025; A47J 19/027; A23N 1/003; A23N 1/00; A23N 1/02

USPC ...... 99/513, 565, 631, 495–512; 426/49, 51, 426/58, 330–330.6, 333, 599, 80, 256, 426/281; 126/594; 241/101.1, 241/168–169.2; 100/213, 214–294
See application file for complete search history.

(56) References Cited

U.S. PATENT DOCUMENTS

| | | | | |
|---|---|---|---|---|
| 1,757,609 | A * | 5/1930 | Beardsley | A47J 19/022 99/485 |
| 1,861,426 | A * | 5/1932 | Davis | A47J 19/022 99/485 |
| 1,957,346 | A * | 5/1934 | Larson | A47J 19/022 99/485 |
| 2,057,227 | A * | 10/1936 | Blum | A47J 19/022 99/485 |
| 2,109,653 | A * | 3/1938 | Scurlock | A47J 19/022 100/238 |

(Continued)

*Primary Examiner* — David Angwin
*Assistant Examiner* — Gyounghyun Bae
(74) *Attorney, Agent, or Firm* — Invention To Patent Services; Alex Hobson (57) ABSTRACT

A hand operable juicer having a handle extending from beneath a juice receptacle is described. The handle has a drive link end that couples with a drive mechanism to rotate a drive shaft that extends up through a drive shaft conduit and couples with a pulping crown. Gear and crank type drive mechanisms are described. In some embodiments of the invention, the drive mechanism is configured to provide a rotational advantage, whereby a certain degree of rotation of the handle around the pulping crown rotational axis produces a higher degree of rotation of the pulping crown. The hand operable juicer described is easy to operate and easy to clean.

13 Claims, 8 Drawing Sheets

(56) References Cited

U.S. PATENT DOCUMENTS

| | | | | |
|---|---|---|---|---|
| 2,553,942 A * | 5/1951 | Roos | A47J 19/022 | 100/125 |
| 3,580,314 A * | 5/1971 | Besora | A47J 19/022 | 99/504 |
| 4,125,064 A * | 11/1978 | Ackeret | A47J 19/022 | 99/505 |
| 4,711,167 A * | 12/1987 | Sano | A47J 19/022 | 241/169.1 |
| 5,950,529 A * | 9/1999 | Molloy | A23N 7/02 | 99/516 |
| 6,029,568 A * | 2/2000 | Pascotti | A47J 19/027 | 241/282.1 |
| 6,070,519 A * | 6/2000 | Sham | A47J 19/02 | 99/348 |
| 6,155,164 A * | 12/2000 | Egana | A47J 19/022 | 100/125 |
| 6,539,848 B2 * | 4/2003 | Wang | A47J 19/022 | 99/506 |
| 6,668,709 B1 * | 12/2003 | Codina Vilana | A47J 19/027 | 99/501 |
| 6,813,996 B1 * | 11/2004 | Kao | A47J 19/022 | 99/506 |
| 2004/0261633 A1 * | 12/2004 | Greenberg | A47J 19/025 | 99/506 |
| 2005/0028682 A1 * | 2/2005 | Steffl | A47J 19/02 | 99/501 |
| 2005/0028683 A1 * | 2/2005 | Areh | A47J 19/02 | 99/501 |
| 2006/0169152 A1 * | 8/2006 | Lin | A47J 19/025 | 99/495 |
| 2006/0207445 A1 * | 9/2006 | Durris | A47J 19/027 | 100/213 |
| 2007/0277380 A1 * | 12/2007 | Maher | A47J 19/02 | 30/120.1 |
| 2010/0050885 A1 * | 3/2010 | Vanderstegen-Drake | B30B 9/22 | 99/501 |
| 2010/0170406 A1 * | 7/2010 | Chuang | A47J 19/022 | 100/126 |
| 2010/0229736 A1 * | 9/2010 | Griffith | A47J 19/022 | 100/125 |
| 2012/0103203 A1 * | 5/2012 | Hensel | A47J 43/0761 | 99/504 |
| 2015/0078932 A1 * | 3/2015 | Ruiz Martinez | F01B 1/08 | 417/341 |

* cited by examiner

FIG. 8

HAND OPERABLE JUICER

CROSS REFERENCE TO RELATED APPLICATIONS

This application is a divisional of U.S. patent application Ser. No. 13/861,514, filed on Apr. 12, 2013, entitled Hand Operable Juicer which is currently allowed.

BACKGROUND OF THE INVENTION

Field of the Invention

The present invention relates to hand operable juicers and in particular hand operable juicers having a drive handle.

Background

Hand operated devices for extracting juice most often require the user to place the fruit over a fluted extractor and twist the fruit manually. Manually twisting the fruit is cumbersome and has limited effectiveness for removing juice. Juice extractors having a handle attached to the extractor are described in U.S. Pat. No. 1,861,426, to Davis et al, and U.S. Pat. No. 1,757,609 to Beardsley et al. The handles shown and described are attached directly to the extractor and provide no rotational advantage, whereby turning the handle a given rotational degree results in the same amount of rotation of the extractor. Furthermore, these handles extend out over the juice collector and pressing down on the handle creates a tipping force, thereby making the juicer unstable and difficult to use.

SUMMARY OF THE INVENTION

The invention is directed to a juicer comprising a handle that extends out from beneath the juice receptacle. With the handle extending from beneath the juice receptacle, the juicer, of the present invention, is more stable, whereby pressing down on the handle does not cause the juicer to tip-over. The handle is coupled with a drive mechanism, whereby when the handle is rotated around the perimeter of the juicer, the pulping crown rotates. In an exemplary embodiment, the drive mechanism comprises gears that may provide a rotational advantage to the handle rotation, whereby rotation of the handle a given amount around the juicer produces a larger amount of rotation of the pulping crown. For example, the gear ratio may be 2:1, whereby rotation of the handle 45 degrees creates 90 degrees of rotation of the pulping crown. In another exemplary embodiment, the drive mechanism comprises a crank drive mechanism. A drive shaft conduit is configured through the base of the juice receptacle and extends up to couple with the pulping crown. A drive shaft extends through the drive shaft conduit and couples the pulping crown with the drive mechanism.

The juicer, as described herein, may be configured for extracting fruit from any type of fruit including, but not limited to, citrus fruit, oranges, lemons, grapefruit, watermelons, limes and the like. The juicer may be configured with dimensions to accommodate the various types of fruit, or may have different size and/or shaped pulping crowns to accommodate different fruits. For example, a small pulping crown may be provided for extraction of juice from lemons and limes and a larger pulping crown may be provided for grapefruit. A pulping crown may have any suitable shape and size and typically comprises a dome shaped element comprising a plurality of flutes that extend down from the crown.

The juice receptacle comprises a perimeter wall and a base. In an exemplary embodiment, the juice receptacle comprises a cylindrically shaped perimeter wall, however, the perimeter wall may be any suitable shape. The perimeter wall and base are preferably a one-piece unit, such as a single injection molded part. A juice receptacle may further comprise a spout for easy pouring of the extracted juice.

A drive shaft conduit extends up from the juice receptacle base allowing the drive shaft to couple the drive mechanism with the pulping crown. The extended end of a drive shaft may be configured to couple the filter thereto, and may comprise a notched portion. The drive shaft conduit may be a separate piece that is configured to couple over an opening in the base or more preferably is an integral part of the juice receptacle whereby the drive shaft conduit and juice receptacle are a one-piece unit.

A drive shaft is configured to couple the pulping crown with the drive mechanism and may be any suitable shape. In an exemplary embodiment, the drive shaft is generally rod shaped and comprises a crown interlock on one end and a drive coupler on the opposite end. A crown interlock may comprise one or more notches or wedges that are configured to nest with a drive interlock on the pulping crown. A drive coupler is configured to couple the drive shaft with the drive mechanism and may comprise any number of configurations, depending on the type of drive mechanism. In the case of a gear drive mechanism, the drive coupler may comprise gear teeth configured to engage with gear teeth on the drive link end of the handle. In the case of a crank drive mechanism, the drive coupler may be a crank wedge or an arc shaped piece that is driven by the drive link end of the handle.

A base extension is configured to provide space for the drive mechanism under the juice receptacle. The base extension may be an integral part of the juice receptacle, whereby the base extension and the juice receptacle are a single unit, such as an injection molded single part, or they may be separate parts configured to couple together. A base extension raises the base of the juice receptacle and may comprise any suitable geometry including a plurality of feet. In an exemplary embodiment, the base extension has the same general outer perimeter shape as the juice receptacle perimeter wall and in some embodiments is a generally cylindrical shape. A base extension may comprise a handle opening that extends some portion around the perimeter of the base extension. A handle opening may be a slot that extends about 45 degrees around the pulping crown rotational axis, for example. A handle opening may extend any suitable amount around the pulping crown's rotational axis including, but not limited about 30 degrees or more, about 45 degrees or more, about 60 degrees or more, about 90 degrees or more, about 120 degrees or more, about 150 degrees or more, about 180 degrees or more, and any range between and including the values provided, including from about 30 degrees to about 180 degrees, for example. Hand rotation of the handle about the juicer is most ergonomic in the 45 degree to 60 degree range. It may be difficult for a user to rotate a handle more than about 180 degrees.

A filter may be configured to be inserted under the pulping crown and over the juice receptacle. A filter comprises a plurality of filter openings to allow the juice to pass therethrough. A filter opening may be configured to allow only juice, or juice and some pulp through. A filter may be a disk shaped element having a drive shaft opening to allow the drive shaft to pass therethrough and couple with the pulping crown. The drive shaft opening may be configured to rest on the drive shaft conduit. For example, the drive shaft conduit may comprise a reduced diameter portion on the extended end that is configured to allow the drive shaft opening of the filter to pass there over. The drive shaft may further comprise a notch or other coupling feature to prevent the filter from spinning during use. The drive shaft opening of the filter may be circular in shape and comprise a coupling feature such as a notch or protrusion to couple with the drive shaft conduit. In an exemplary embodiment, the filter is configured to rest on the perimeter wall of the juice receptacle. The filter may further be configured to snap onto the juice receptacle.

The handle is an elongated member that extends from beneath the juice receptacle base beyond the outer perimeter wall. The end of the handle that extends outside of the perimeter wall of the juice receptacle is the handle end and may comprise a knob configured to freely rotate as the handle end is rotated. The opposite end of the handle is the drive link end and may have any suitable configuration depending on the type of drive mechanism. In the case of a gear drive mechanism, the drive link end may comprise a gear that is configured to couple with a gear on the drive shaft. In the case of a crank drive mechanism, the drive link end may comprise a pin element, a crank slot and a crank race.

In a preferred embodiment, the juicer is constructed of a material that is easy to clean and dishwasher safe, such as plastic, and more particularly HDPE. In addition, the juicer may be constructed to make it easy to disassemble whereby the pulping crown, filter, drive shaft conduit, drive shaft, handle and/or other components of the drive mechanism are detachable. In an exemplary embodiment, the filter and pulping crown are detachable and the other components are not readily detachable from the juicer. In another exemplary embodiment, the drive shaft conduit, juice receptacle, and base extension are a one-piece unit.

The juicer of the present invention can be used to extract juice from any number of different types of fruit. The method of extracting the juice, using the juicer as described herein, comprises the steps of: providing a juicer as described herein, providing a fruit half, such as an orange cut in half, placing and pressing the fruit half on the pulping crown, rotating said handle back and forth, thereby rotating the pulping crown back and forth, removing fruit half from pulping crown and pouring juice from the fruit receptacle.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention

DETAILED DESCRIPTION OF THE ILLUSTRATED EMBODIMENTS

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
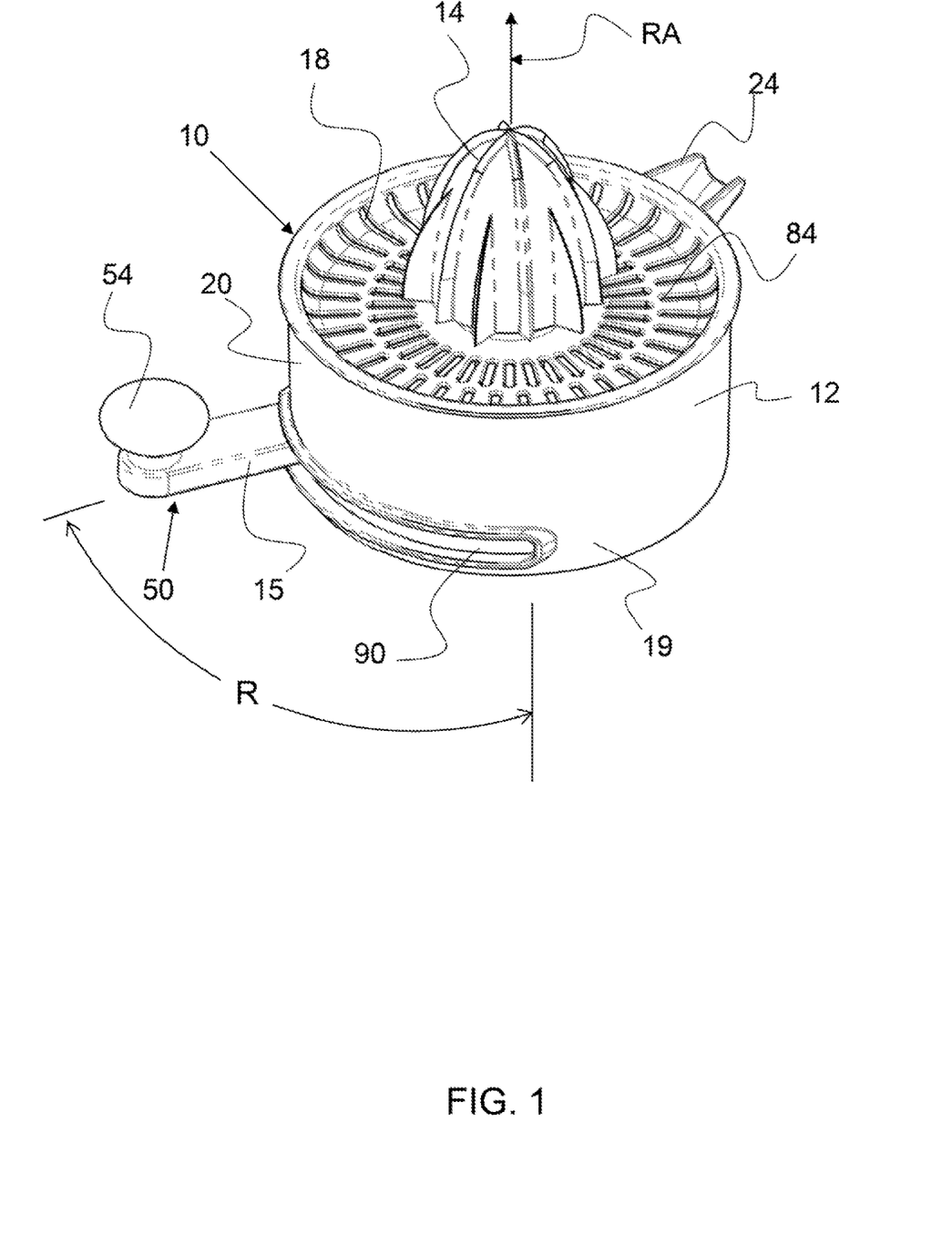
FIG. 1 shows an isomeric view of an exemplary hand operable juicer as described herein.

As shown in FIG. 1, an exemplary hand operable juicer 10, as described herein, comprises a handle 15 that extend from under the juice receptacle 12, and couples with a drive mechanism to rotate the pulping crown 14. The handle comprises a knob 54 on the handle end 50 and extends through the slot 90 in the base extension 19. As shown, the slot extends around the pulping crown's rotational axis RA a radius of R degrees. The pulping crown 14 is configured over the filter 18, which has a plurality slot type openings 84. The filter has a concave configuration with an outer perimeter that is higher than a basin portion that provides a volume of space to retain liquid as it is filtered into the juice receptacle 12. The outer perimeter of the filter rests or couples to the top of the perimeter wall 20. The openings 84 extend up toward the lip, or outer perimeter of the filter, to provide more area for juice flow into the receptacle when pulp is collected in the filter basin portion. A spout 24 provides for easy dispensing of juice from the hand operable juicer 10.

Figure 2:
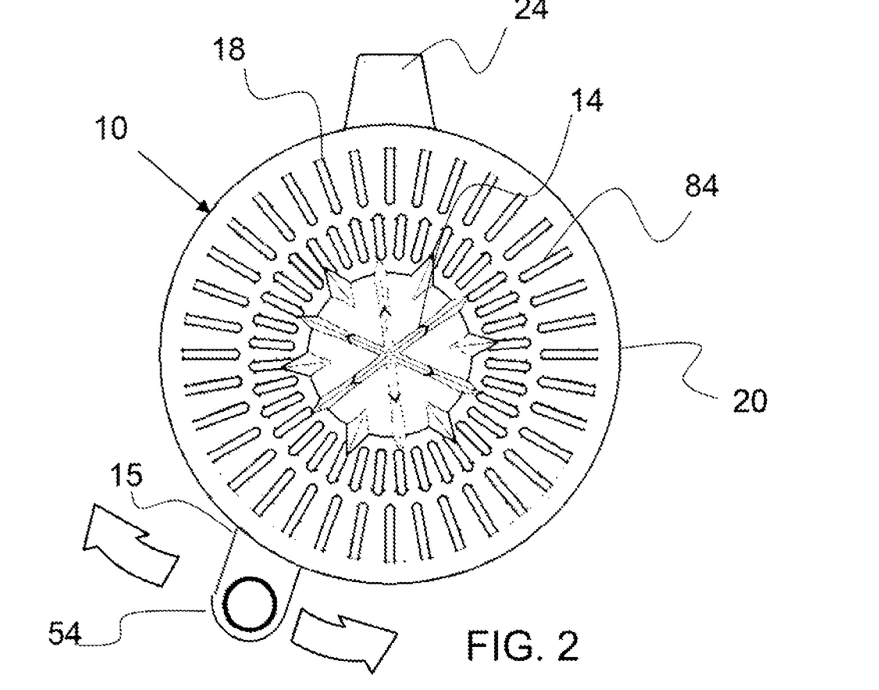
FIG. 2 shows a top down view of an exemplary hand operable juicer as described herein.

As shown in FIG. 2, an exemplary hand operable juicer, as described herein, comprises a handle 15 that extends out from the perimeter wall 20 of the juice receptacle 12. The knob 54 may be configured to freely rotate, thereby facilitating rotation of the handle around the juicer. As described herein, the handle may be rotated about the pulping crown's rotational axis RA, shown in FIG. 3A, any suitable degree.

Figure 3A:
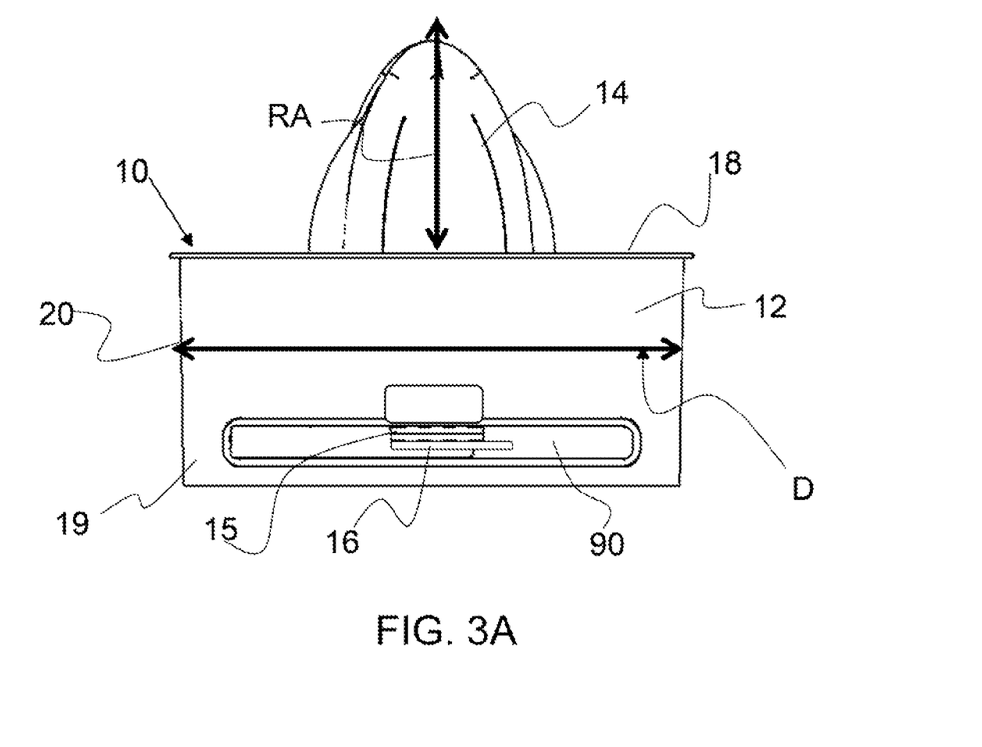
FIGS. 3A-3C show side views of exemplary hand operable juicers as described herein.

As shown in FIG. 3A, an exemplary hand operable juicer 10, as described herein, comprises a pulping crown 14 having a rotational axis RA. The rotational axis extends up through the center of the pulping crown, whereby the pulping crown rotates about this axis. The diameter D of the juice receptacle 12 is show in FIG. 3A. The slot 90 in the base extension 19 reveals a portion of the drive mechanism 16 under the juice receptacle 12. The slot provides support for the handle during rotation.

Figure 3B:
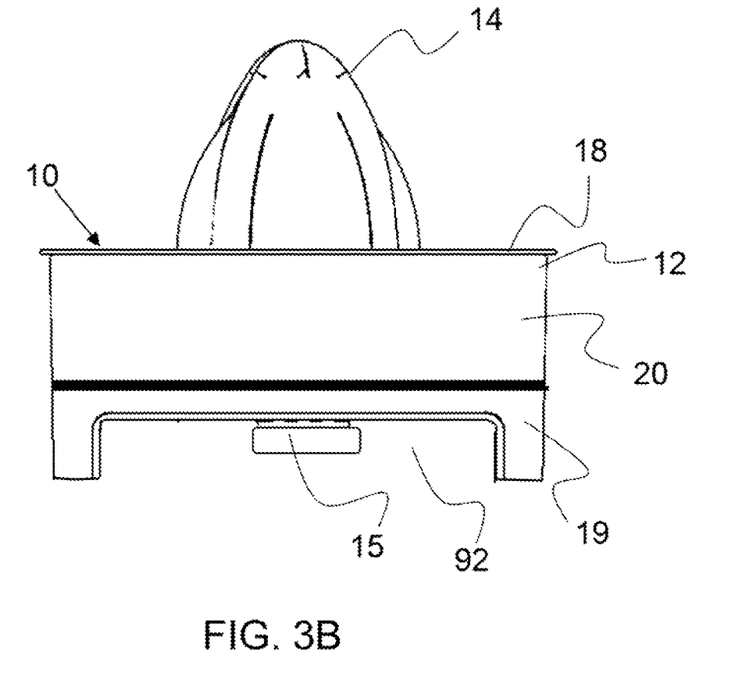

As shown in FIG. 3B, the base extension comprises a handle opening 92 rather than a slot. The base extension 19 is detachable from the juice receptacle 12, as indicated by the line separating the two components in FIGS. 3B-3C. The base extension may be configured to receive the juice receptacle and may comprise any suitable retention feature, such as a retaining lip, notches, etc.

Figure 3C:
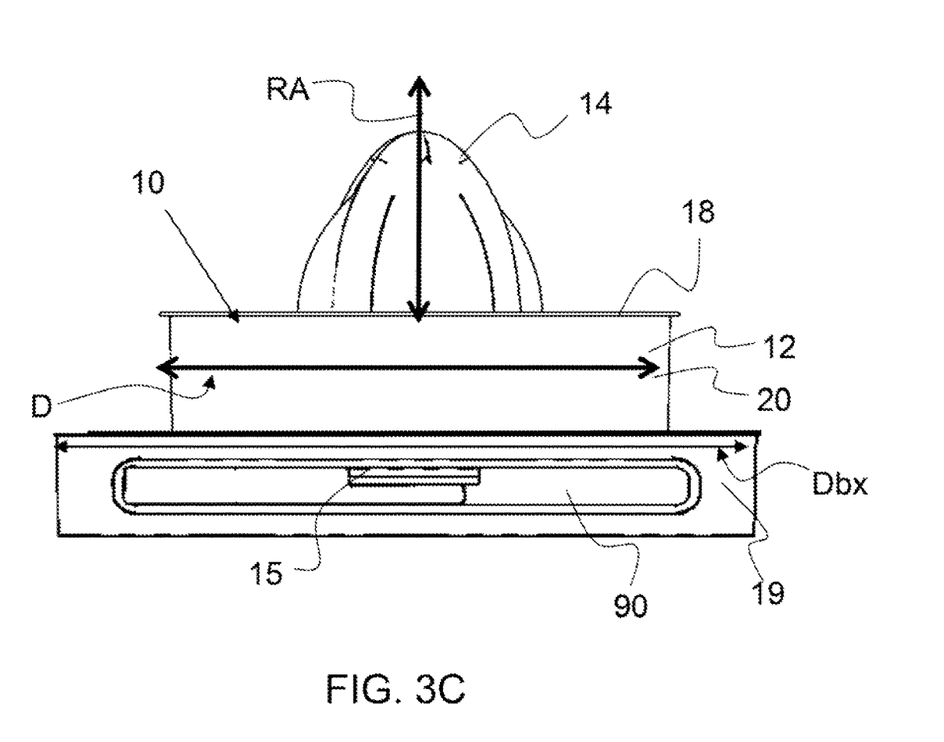

As shown in FIG. 3C, the base extension 19 is larger in diameter Dbx than the diameter of the juice receptacle D and is detachable from the juice receptacle. A juice receptacle may simply be placed over a base extension, whereby the drive shaft is coupled between the two components and subsequently operated. The drive shaft may be configured in the drive shaft conduit or may be attached to the drive mechanism and extend up from the base extension portion of the hand operable juicer.

Figure 4:
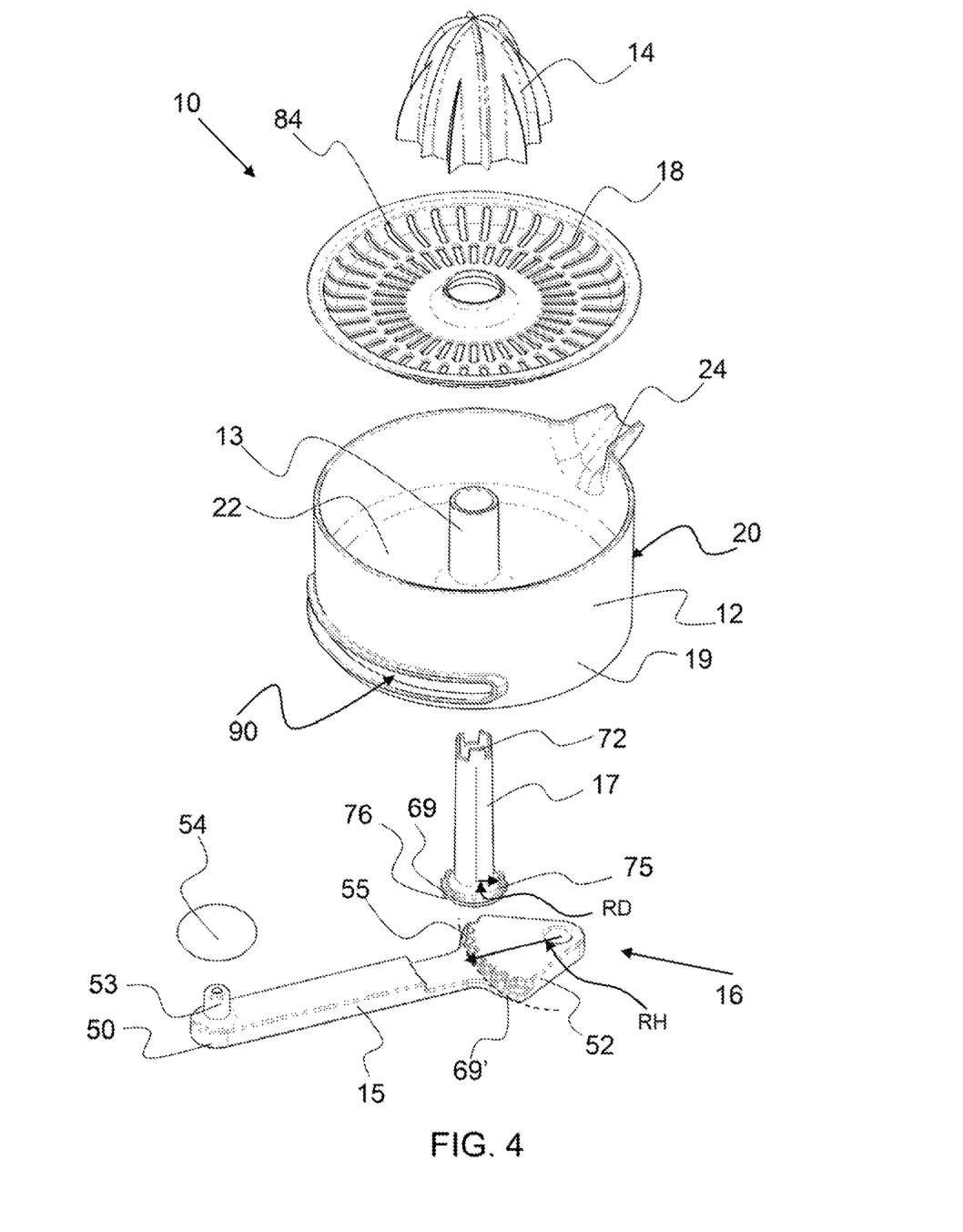
FIG. 4 shows an isometric exploded view of an exemplary hand operable juicer having a gear type drive mechanism as described herein.

As shown in FIG. 4 an exemplary hand operable juicer 10 comprises a handle 15 configured to extend under the base 22 of the juice receptacle 12 and into the base extension space where it couples with the drive mechanism 16. In particular, the drive link end 52 of the handle couples with the drive coupler 75 of the drive shaft 17. The drive coupler 75 end of the drive shaft comprises a drive gear 76 having gear teeth 69. Here the gear teeth 69 do not extend completely around the drive shaft, but in some embodiments may extend around the entire perimeter of the drive coupler. The drive link end 52 of the handle 15 comprises a gear wedge 55 having a plurality of gear teeth 69' configured in an arc having a radius of curvature of RH. The radius RD of the drive gear 76 is much smaller than the equivalent radius of the gear wedge 55, or RH. The gear ratio, or ratio of the equivalent radius of the gear wedge to the radius of the drive gear may be any suitable ratio and is preferably greater than 1.5, but may be greater than about 1, greater than about 1.5, greater than about 2 greater than about 4, greater than about 6 and any range between and including the gear ratios provided.

As shown in FIG. 4, the drive shaft 17 comprises a crown interlock 72 having a geometry to couple with the shaft coupler portion of the pulping crown 14. The drive shaft has a general rod shape but may have any suitable shape.

As shown in FIG. 4, the drive shaft conduit 13 extends up from the juice receptacle base 22 and comprises an opening for receiving the drive shaft. The drive shaft conduit is an integral part of the juice receptacle 12, as they are a one-piece unit. The shaft conduit may be configured to be detachable from base of the juice receptacle, however.

Figure 5:
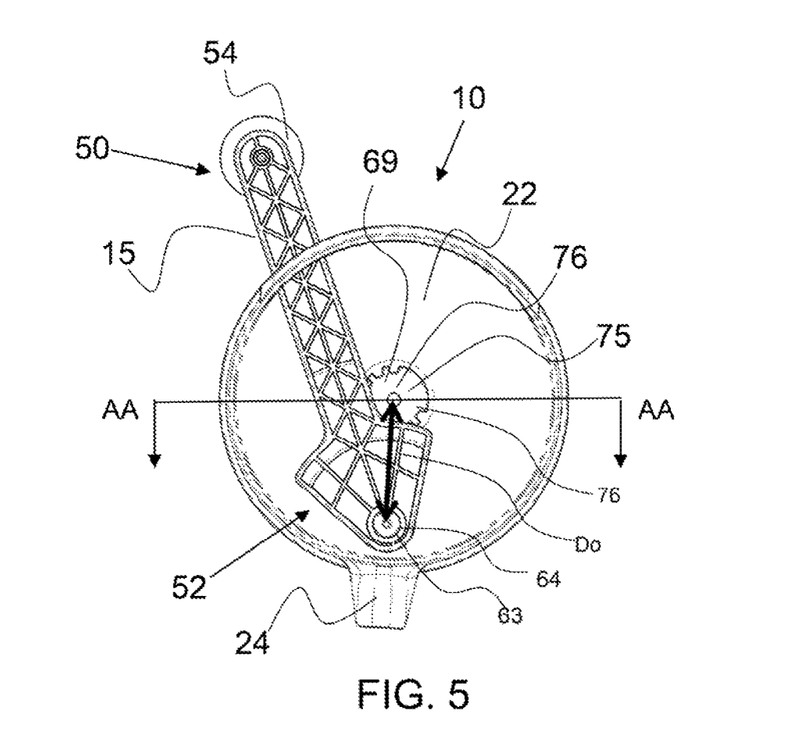
FIG. 5 shows a bottom view of an exemplary hand operable juicer having a gear type drive mechanism as described herein.

As shown in FIG. 5, an exemplary hand operable juicer 10 has a gear type drive mechanism as shown in FIG. 4. The drive link end 52 of the handle 15 comprises a pin opening 64 and the pin 63 extending from the base of the juice receptacle is inserted therein. The drive coupler 75 comprises a gear 76 having gear teeth 69. This gear mates with a gear wedge on the handle. Rotation of the handle around the external perimeter of the juice receptacle rotates the gear wedge that in turn rotates the drive coupler gear 76. The drive coupler is coupled to, or an integral part of, the drive shaft and thereby turns the drive shaft.

Figure 6:
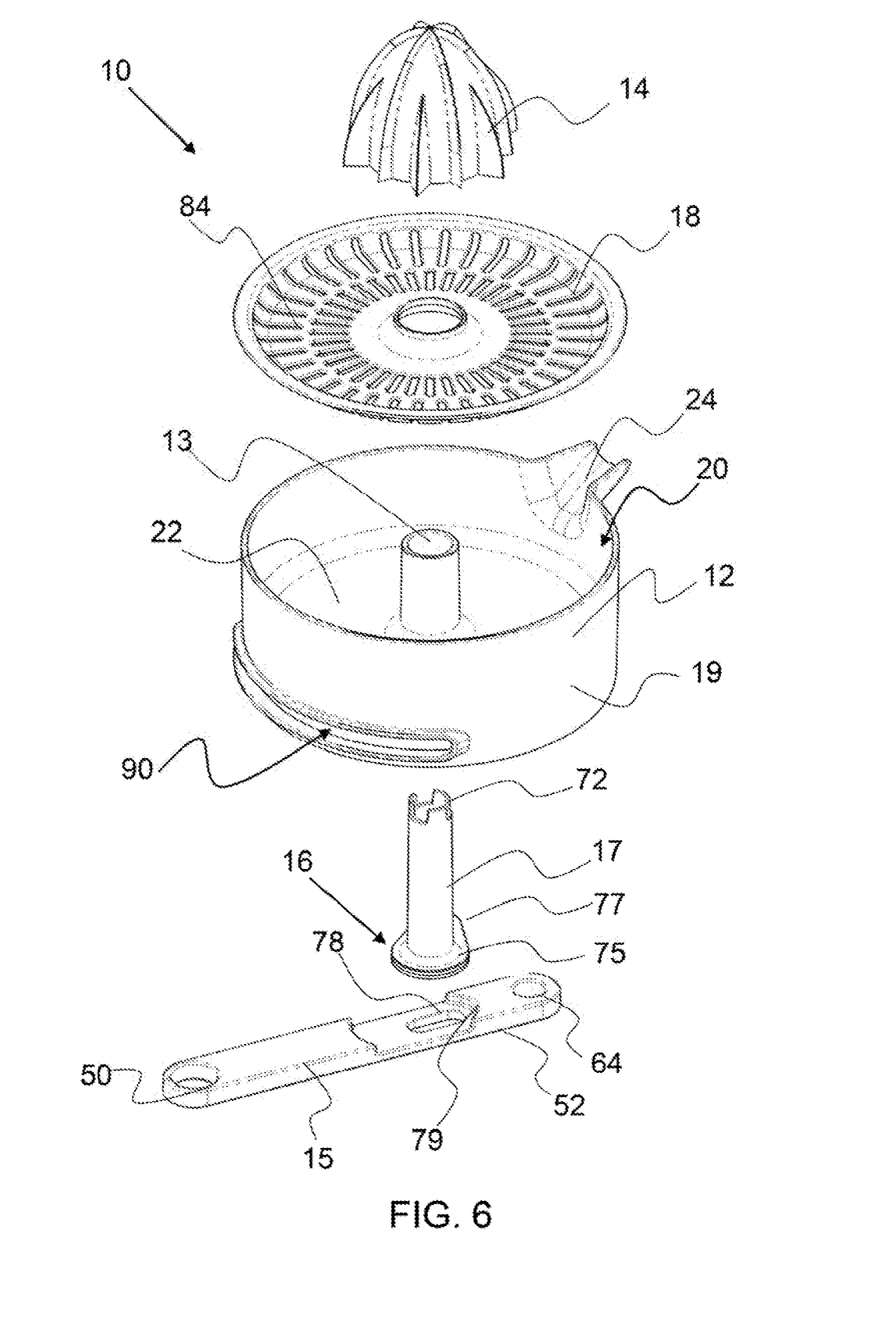
FIG. 6 shows an isometric exploded view of an exemplary hand operable juicer having a crank type drive mechanism as described herein.

As shown in FIG. 6, an exemplary hand operable juicer 10 has a crank type drive mechanism comprising a crank wedge 77 coupled to the drive shaft 17 and a crank race 79 on the drive link end 52 of the handle 15. A pin opening 64 is configured in the drive link end 52 of the handle and is configured to couple with a pin (not shown) extending from the bottom surface of the base 22 of the juice receptacle. The drive link end of the handle may also comprise a crank slot, where a pin extending from the drive shaft (not shown) is configured for insertion therein. The handle acts as an input lever for the crank mechanism, whereby rotation of the handle turns the crank wedge. The handle 15 does not comprise a knob in this exemplary embodiment.

Figures 7A, 7B:
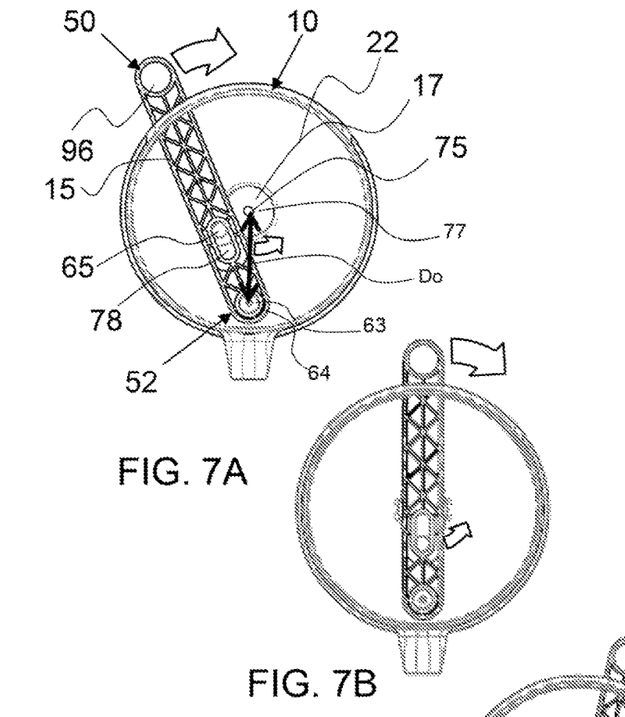
FIGS. 7A-7D show a bottom view of an exemplary hand operable juicer having a crank type drive mechanism as it is moved from a first location in FIG. 7A to a second location in FIG. 7D, as described herein.
Figures 7C, 7D:
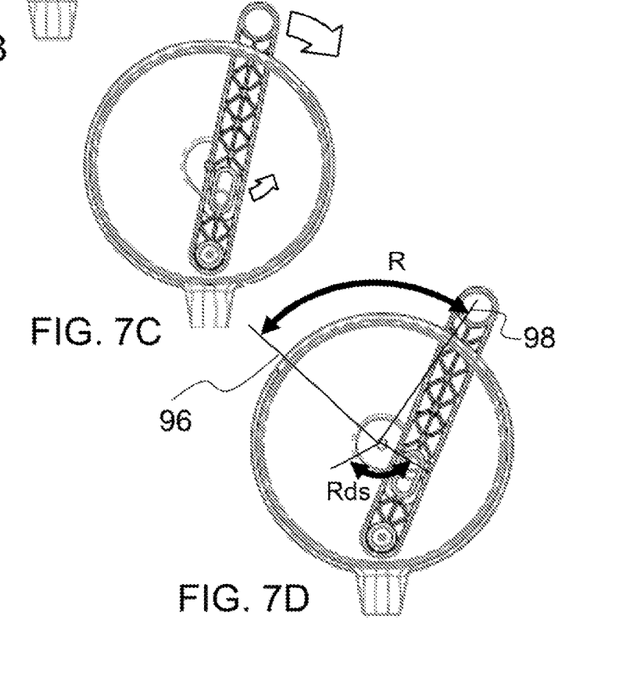

As shown in FIG. 7A an exemplary hand operable juicer 10 has a crank type drive mechanism as shown in FIG. 6. The drive link end 52 of the handle 15 comprises a pin opening 64, and a pin 63 extending down from the bottom of the base is configured therethrough. This pin 63 creates the rotation point for the handle. The rotational point of the handle is offset in location from the rotational axis of the pulping crown. The rotational point of the handle may be offset any suitable offset distance Do, as shown in FIGS. 5 and 7A, from the rotational axis of the pulping crown or drive shaft 17, including, more than about 5 mm, more than about 10 mm, more than about 15 mm, more than about 25 mm, more than about 35 mm, more than about 50 mm, more than about 75 mm, more than about 100 mm, and any range between and including the offset distances provided. The crank wedge 77 comprises a crank pin 65 that is configured in the crank slot 78. This configuration rotates the drive shaft when the handle is rotated. FIGS. 7B and 7C show the handle in intermediate positions between the first limit position and second limit position as shown in FIGS. 7A and 7D, respectively. The handle moves over an arc R around the pulping crown's rotational axis from the first limit position 96, as shown in FIG. 7A to the second limit position 98, as shown in FIG. 7D. Likewise the crank wedge, attached to the drive axis, moves over an arc around the pulping crown's rotational axis Rds degrees from the first limit position FIG. 7A to the second limit position 7D, as shown in FIG. 7D. The pin 63 moves within the crank slot 78 during the rotation of the handle to drive the crank wedge 77.

Figure 8:
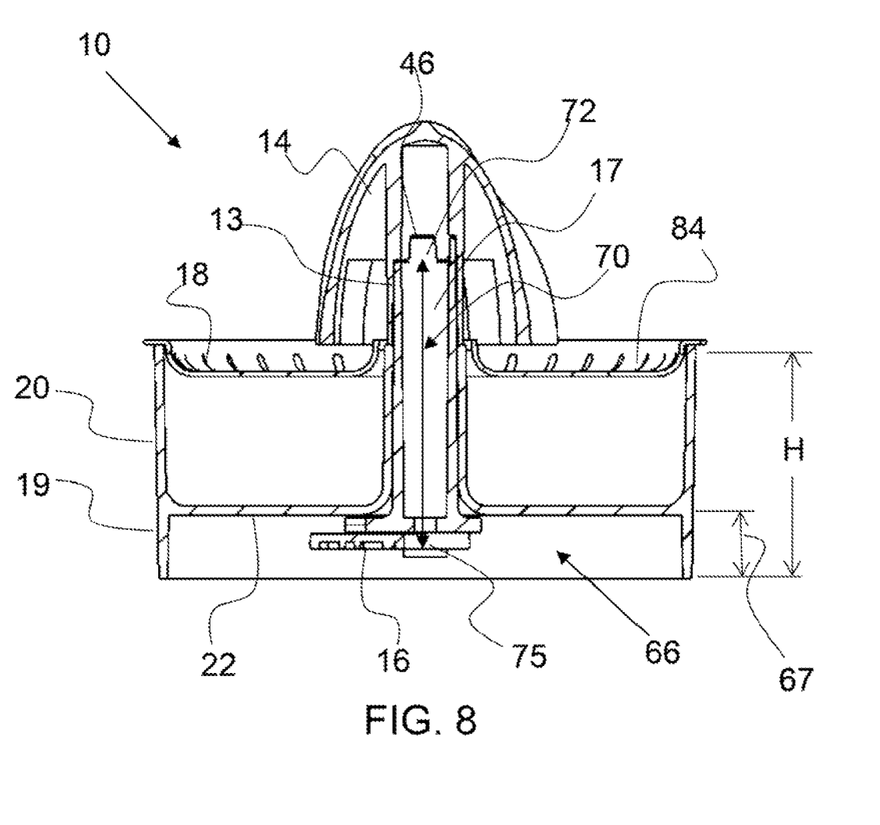
FIG. 8 shows a side cross-sectional view taken along line AA of FIG. 5 of an exemplary hand operable juicer having as described herein.

As shown in FIG. 8, an exemplary hand operable juicer 10 has a drive mechanism 16 configured under the juice receptacle 12, and within a drive space 66 created by the base extension 19. The base extension is clearly shown as an extension of the perimeter wall 20 of the juice receptacle 12. The base extension and juice receptacle are a one-piece unit as shown in FIG. 8. The drive shaft 17 extends up through the drive shaft conduit 13 where the crown interlock is coupled with the shaft coupler of the pulping crown 14. The drive shaft has an axial length 70 and is configured to extend from the drive mechanism 16 to the shaft coupler 72 of the pumping crown. This cross-sectional view shows how the drive shaft nests within the pulping crown to provide rotation. The drive shaft conduit is an integral part of the juice receptacle 12, whereby the drive shaft conduit and the juice receptacle are a one-piece unit. The filter 18 is configured over the juice receptacle and rests on the top portion of the perimeter wall 20.

In an exemplary embodiment, the hand operable juicer, as described herein, consists of a juice receptacle, drive shaft conduit, drive shaft, filter, pulping crown, base extension, drive mechanism and handle. The drive mechanism may be a manually powered gear mechanism or a crank mechanism, as described herein, for example.

EXAMPLES

Hand operable juicers, as shown in FIGS. 4 and 6, were made through fused deposition stereo lithography process. The juice receptacle, base extension and drive shaft conduit were made as a one-piece unit. The drive shaft was made with the drive coupler, also as a one-piece unit. The drive shaft was positioned inside of the drive shaft conduit and the handle was, positioned through the slot 90 and coupled with the drive coupler. The filter was placed over the juice receptacle and the pulping crown was coupled with the crown interlock 72 of the drive shaft 17. The knob was attached or snapped onto the knob post, in the case of the drive mechanism version of the hand operable juicer shown in FIG. 4.

A lemon was cut in half and manually pressed onto the crown. The handle was moved from a first limit position where the handle contacted one end of the slot to a second limit position, where the handle contacted the opposing slot end. The handle was then moved back to the first limit position and this process was repeated while manually pressing down on the lemon half. Juice from lemon was extracted and filtered through the filter openings into the juice receptacle. The lemon half was removed from the pulping crown and juice was poured from the juice receptacle.

Definitions

A gear, as used herein, is defined as a plurality of gear teeth configured to couple with a matching gear and may be a full circular gear or a portion of a gear, such as a gear wedge.

The term juicer, as used in reference to the present invention, is used herein in place of hand operable juicer, for brevity.

A handle drive element, as used herein, comprises any of the components configured on the drive link end of the handle configured to couple with the drive coupler to rotate the pulping crown when the handle is rotated. A handle drive element includes a handle gear or gear portion, a pin or pin opening, a crank race, and/or a crank slot.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A hand operable juicer comprising:
 a. a juice receptacle comprising:
  i. a perimeter wall;
  ii. a receptacle base; and
  iii. a spout extending from the top portion of the perimeter wall;
 b. a drive shaft conduit that is an integral part of the juice receptacle and extends up from the receptacle base:
  i. a drive shaft conduit perimeter wall configured around an opening in the receptacle base and extending up from the receptacle base;
  wherein, in use, a quantity of juice collects in the receptacle between the perimeter wall and the drive shaft conduit;
 c. a pulping crown having a rotational axis;
 d. a handle having an extended end and a drive link end;
  wherein the drive link end of the handle comprises a pin opening for receiving a pin extending down from the receptacle base;
  wherein said pin extending down from the receptacle, base is offset from and parallel with a rotation axis of a drive shaft and wherein the handle leas a rotation axis about said pin;
 e. a crank type drive mechanism configured under the receptacle base and configured to rotate the pulping crown when said handle is rotated comprising:
  i. a crank slot configured in the handle; and
  ii. a crank wedge coupled to said drive shaft and comprising a crank pin that extends into the crank slot;
  whereby when the handle is rotated about the rotation axis of the handle, the crank pin moves within the crank slot to rotate the crank wedge, which rotates the drive shaft and the pulping crown;
 f. said drive shaft comprising:
  i. an axial length that extends from the crank type drive mechanism below the receptacle base, through the drive shaft conduit to the pulping crown, where it is coupled to the pulping crown;
 g. a filter that rests on the top portion of the receptacle perimeter wall and comprises:
  i. a plurality of openings;
 h. a base extension that extends down from the receptacle base and comprises a handle opening that extends around a portion of a rotation axis of the pulping crown;
  wherein the handle extends out from the base extension through the handle opening from the crank type drive mechanism to the exterior of the perimeter wall,
  wherein the drive shaft couples a drive mechanism with the pulping crown;
  wherein the hand operable juicer is hand operable whereby when the handle is rotated about the rotational axis of the pulping crown, the pulping crown rotates;
  wherein, in use, juice is collected in the juice receptacle between the perimeter wall and the drive shaft conduit such that said collected juice is isolated from the crank type drive mechanism configured under the juice receptacle; and
  wherein said hand operable juicer is configured to dispensed said collected juice out of the juice receptacle through the spout.

2. The hand operable juicer of claim 1, wherein the handle comprises a crank race that guides the crank wedge during rotation when the handle is rotated.

3. The hand operable juicer of claim 1, wherein the base extension has a cylindrical shape.

4. The hand operable juicer of claim 3 wherein the handle opening is a slot in the base extension.

5. The hand operable juicer of claim 4, wherein the handle opening extends no more than 90 degrees around said hand operable juicer.

6. The hand operable juicer of claim 3, wherein the base extension and the juice receptacle are a one-piece unit.

7. The hand operable juicer of claim 1, wherein the handle opening is a slot that extends no more than 90 degrees around the hand operable juicer.

8. The hand operable juicer of claim 1, wherein the perimeter wall is circular in shape and wherein the drive shaft conduit is tubular in shape and substantially centrally configured within the receptacle base.

9. The hand operable juicer of claim 1, wherein the drive shaft conduit, the juice receptacle and base extension are a one-piece unit.

10. The juicer of claim 1, wherein the drive shaft comprises a crown interlock whereby the pulping crown may be rotated by the drive shaft.

11. The juicer of claim 1, wherein the base extension is detachably attachable to the juice receptacle.

12. The hand operable juicer of claim 1, wherein only the pulping crown and filter portion are configured to be detachably attachable to the hand operable juicer.

13. The hand operable juicer of claim 1, wherein the handle comprises a knob configured on the handle end that is configured to freely rotate when the handle is rotated.

* * * * *